(12) United States Patent
Stewart

(10) Patent No.: US 9,464,651 B2
(45) Date of Patent: Oct. 11, 2016

(54) LOWER CORNER CONNECTOR FOR MODULAR SPORTS GOAL

(71) Applicant: Thomas Edward Stewart, Brampton (CA)

(72) Inventor: Thomas Edward Stewart, Brampton (CA)

( * ) Notice: Subject to any disclaimer, the term of this patent is extended or adjusted under 35 U.S.C. 154(b) by 0 days.

(21) Appl. No.: 15/134,301

(22) Filed: Apr. 20, 2016

(65) Prior Publication Data

US 2016/0230795 A1      Aug. 11, 2016

Related U.S. Application Data

(63) Continuation of application No. 14/720,956, filed on May 25, 2015, now Pat. No. 9,341,208, which is a continuation of application No. 13/865,063, filed on Apr. 17, 2013, now Pat. No. 9,056,233.

(51) Int. Cl.
*A63B 63/00* (2006.01)
*A63B 71/02* (2006.01)
*F16B 7/04* (2006.01)
*F16B 9/02* (2006.01)

(52) U.S. Cl.
CPC ............... *F16B 9/02* (2013.01); *A63B 63/004* (2013.01); *A63B 71/023* (2013.01); *A63B 2210/50* (2013.01); *F16B 7/0486* (2013.01); *Y10T 403/42* (2015.01)

(58) Field of Classification Search
CPC  A63B 63/004; A63B 71/023; A63B 71/028; E04H 12/2238; E04H 12/2269; F16B 9/02
USPC ............ 403/205, 231, 406, 361; 256/65.14; 473/446, 478; 273/400
See application file for complete search history.

(56) References Cited

U.S. PATENT DOCUMENTS 9,056,233 B2 *  6/2015  Stewart ................ A63B 63/004
9,341,208 B2 *  5/2016  Stewart ................ A63B 63/004

* cited by examiner

*Primary Examiner* — Joshua Kennedy
(74) *Attorney, Agent, or Firm* — Steven M. Greenberg; CRGO Law

(57) ABSTRACT

A lower corner connector for a modular sports goal comprises a first tube having a generally circular inner surface and a second tube extending substantially perpendicularly to the first tube. The first tube has an open end for receiving an upright and a base opposite the open end for resting on a surface. A retainer projects inwardly from the inner surface of the first tube for engaging and retaining the upright and permitting the upright to rock toward and away from the second tube within the first tube to assist in absorbing impact forces.

5 Claims, 4 Drawing Sheets

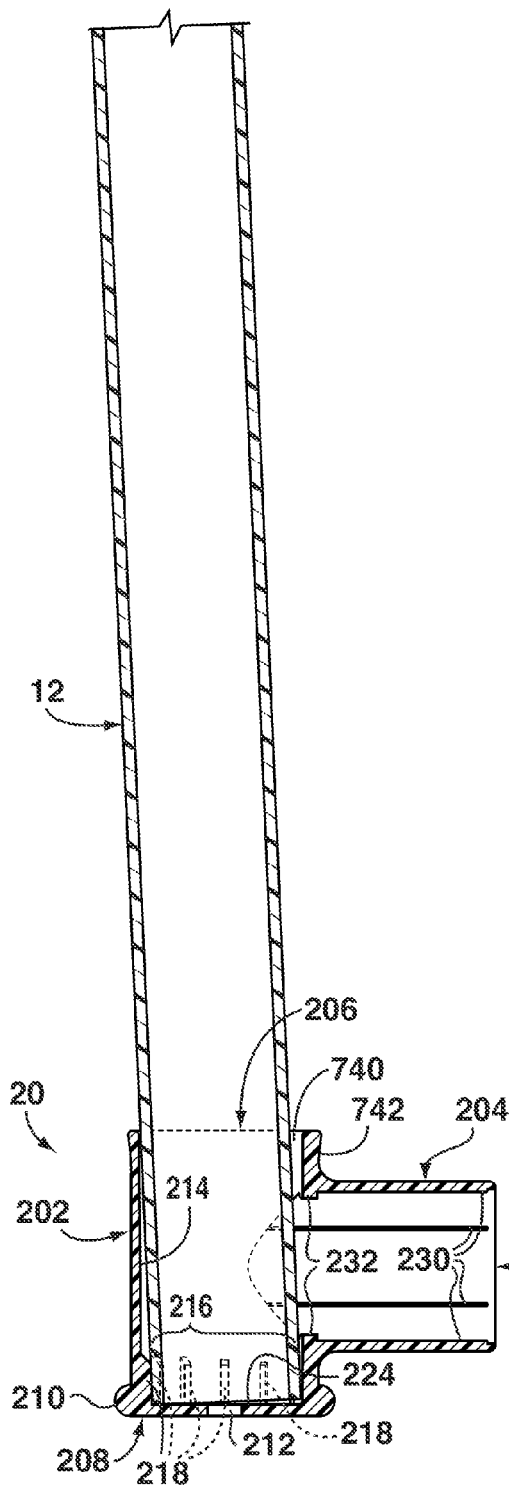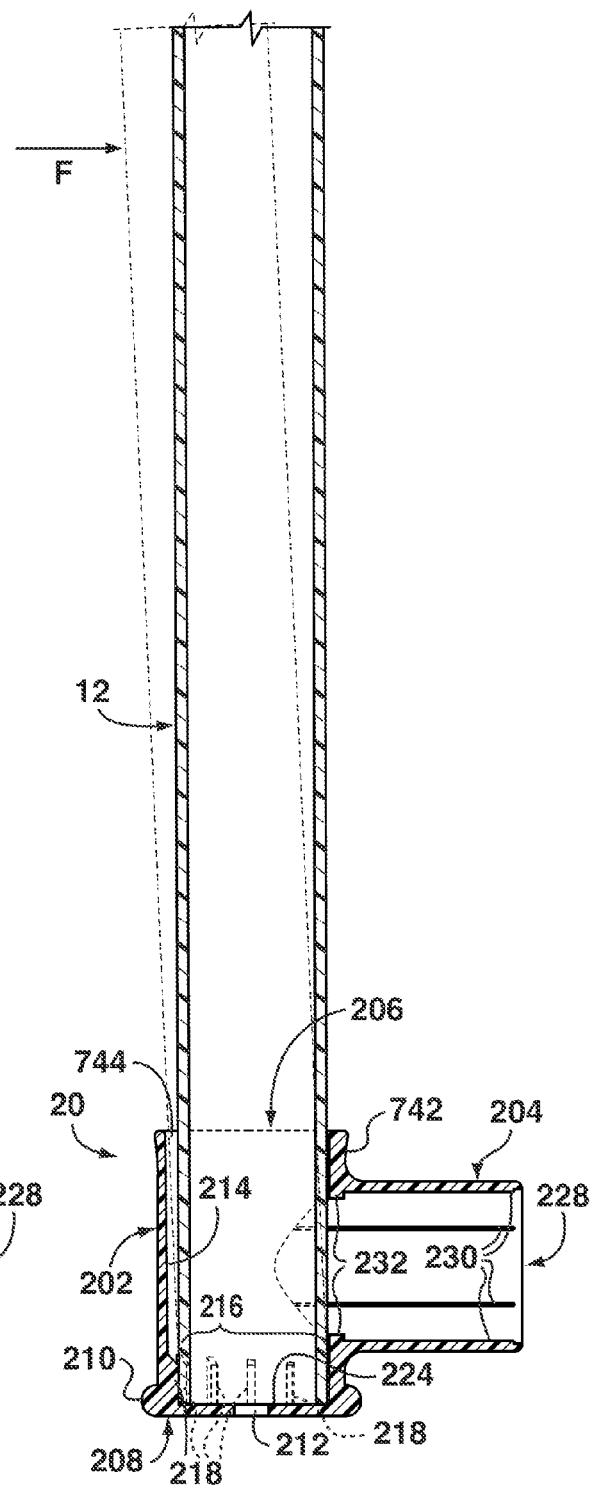

LOWER CORNER CONNECTOR FOR MODULAR SPORTS GOAL

CROSS-REFERENCE TO RELATED APPLICATIONS

This application is a Continuation of U.S. application Ser. No. 14/720,956, filed May 25, 2015, entitled "LOWER CORNER CONNECTOR FOR MODULAR SPORTS GOAL," which is a Continuation of U.S. application Ser. No. 13/865,063, filed on Apr. 17, 2013, U.S. Pat. No. 9,056,233, issued on Jun. 16, 2015, entitled "LOWER CORNER CONNECTOR FOR MODULAR SPORTS GOAL," the entirety of which are incorporated herein by reference.

TECHNICAL FIELD

The present disclosure relates to modular sports goals, and more particularly to connectors for modular sports goals.

BACKGROUND

A number of modular sports goals are known in the art, for use in games such as soccer, hockey, field hockey, lacrosse and water polo. Typically, such goals comprise a plurality of elongate tubes joined together, either permanently or temporarily (e.g. for the duration of a game) by connectors to form the shape of a goal. Typically the tubes and connectors are made of plastic, aluminum or light steel.

One problem associated with modular sports goals is that a forceful impact, such as from a soccer ball or other sports projectile moving at high velocity, can cause the connectors to break. The impact of a player can also break the connectors, and lead to injury to the player as well.

One example of a modular sports goal directed to addressing this problem is disclosed in U.S. Pat. No. 5,857,928 to Stewart, which teaches a portable soccer practice goal net which uses specialized struts to assist in absorbing impact forces. While these struts can address the problem of breakage, they increase the complexity of the goal structure considerably. This increased complexity makes it more difficult for younger players to assemble the goal from a disassembled form, and also makes it more difficult to transport the disassembled goal, since there are a greater number of parts. Moreover, the struts must have sufficient thickness to provide the required breakage resistance, thereby increasing the weight of the goal system with further adverse effects on transportability.

SUMMARY

A lower corner connector for a modular sports goal allows an upright of the goal to rock backward under impact while remaining firmly retained in the lower corner connector, thereby reducing the risk of damage.

The lower corner connector comprises a first tube having a generally circular inner surface and a second tube extending substantially perpendicularly to the first tube. The first tube has an open end for receiving an upright and a base opposite the open end for resting on a surface. A retainer projects inwardly from the inner surface of the first tube for engaging and retaining the upright and permitting the upright to rock toward and away from the second tube within the first tube to assist in absorbing impact forces.

In one embodiment, the retainer comprises a plurality of circumferentially spaced individual projections, and these projections may increase in radial length with increasing circumferential distance from the second tube. The projections may define a notional circle of smaller diameter than the inner surface and which is non-concentric with the inner surface and offset toward the second tube. In a particular embodiment, the circumference of the notional circle intersects the circumference of the inner surface adjacent the second tube.

BRIEF DESCRIPTION OF THE DRAWINGS

These and other features will become more apparent from the following description in which reference is made to the appended drawings wherein:

FIG. 7A is a side cross-sectional view of the corner connector of FIG. 2, with an upright received therein in a first position; and FIG. 7B is a side cross-sectional view of the corner connector of FIG. 2, with the upright received therein in a second position.

DETAILED DESCRIPTION

Figure 1:
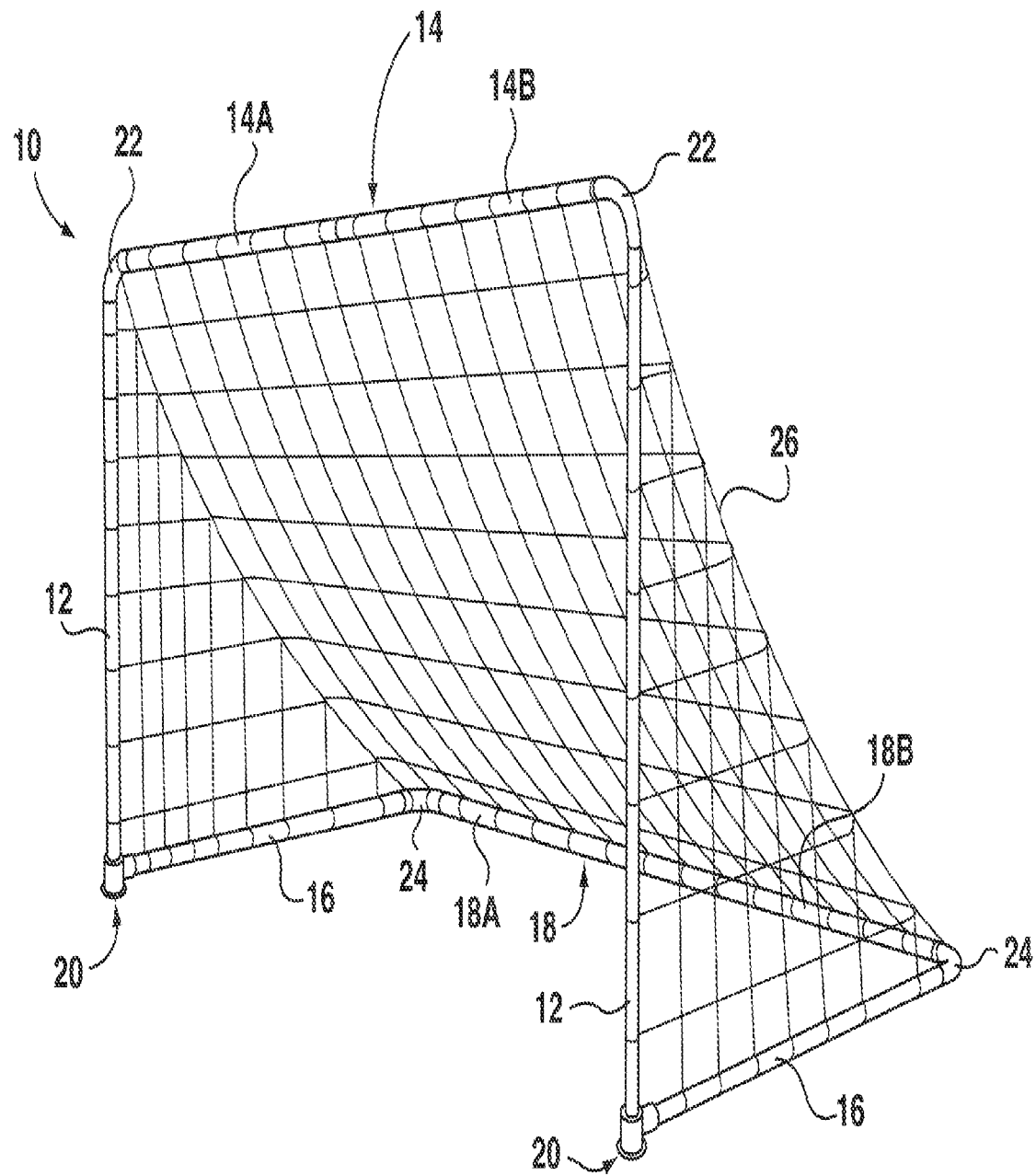
FIG. 1 is a perspective view of an exemplary modular sports goal incorporating exemplary corner connectors as described herein.

Reference is now made to FIG. 1, in which an exemplary modular sports goal is indicated generally by reference 10. The sports goal 10 comprises two parallel elongate tubular uprights 12, two elongate tubular crossbar members 14A, 14B joined to form a crossbar 14, two elongate tubular rear support members 16, and two elongate tubular rear cross support members 18A, 18B joined together to form a rear cross support 18. The uprights 12 are secured in respective lower corner connectors 20, and the crossbar 14 extends between the two uprights 12 and is joined to the upper ends of the uprights by two elbow-shaped crossbar connectors 22. The rear support members 16 are also secured in the lower corner connectors 20, and extend away from the uprights 12 and the crossbar 14 substantially perpendicularly to the uprights 12 and the crossbar 14. The rear cross support 18 extends between the rear support members 16, substantially parallel to the crossbar 14, and is joined to the rearmost ends of the rear support members 16, that is, the ends furthest from the lower corner connectors 20, by two elbow-shaped rear support connectors 24. In one embodiment, the uprights 12 and the crossbar members 14A, 14B are friction fit into the crossbar connectors 22 and the rear support members 16 and the rear cross support members 18A, 18B are friction fit into the rear support connectors 24. One of the crossbar members 14A, 14B may be friction fit into the other to form the crossbar 14, and similarly one of the rear cross support members 18A, 18B may be friction fit into the other to form the rear cross support 18. Certain ends of the respective members may include an inwardly stepped portion of reduced diameter to facilitate the friction fit while maintaining a substantially constant outer diameter. A net 26 may be attached to the modular sports goal 10 in known manner. Optionally, for ease of manufacturing, the elbow-shaped crossbar connectors 22 and elbow-shaped rear support connectors 24 may be replaced by additional lower corner connectors 20 so that only one type of connector is used.

Reference is now made to FIGS. 2 to 6. FIGS. 2 to 6 show the exemplary lower corner connector 20 for a modular sports goal. The lower corner connector 20 comprises a first tube 202 and a second tube 204 extending substantially perpendicularly to the first tube 202. The first tube 202 has an open end 206 for receiving an upright, such as the upright 12 in FIG. 1, and a base 208 opposite the open end 206 for resting on a surface such as a sports field. In the illustrated embodiment, the base 208 forms a toroidal flange 210 and substantially closes the end of the first tube 202 opposite the open end 206, save for a central aperture 212, opposite the open end 206 of the first tube 202, and as such the base 208 will serve as a stop and supports an upright when fully inserted into the first tube. In other embodiments, the base may be completely closed, or the first tube 202 may have two open ends with one of the open ends serving as the base, and may be provided with one or more stops for supporting an upright.

Figure 2:
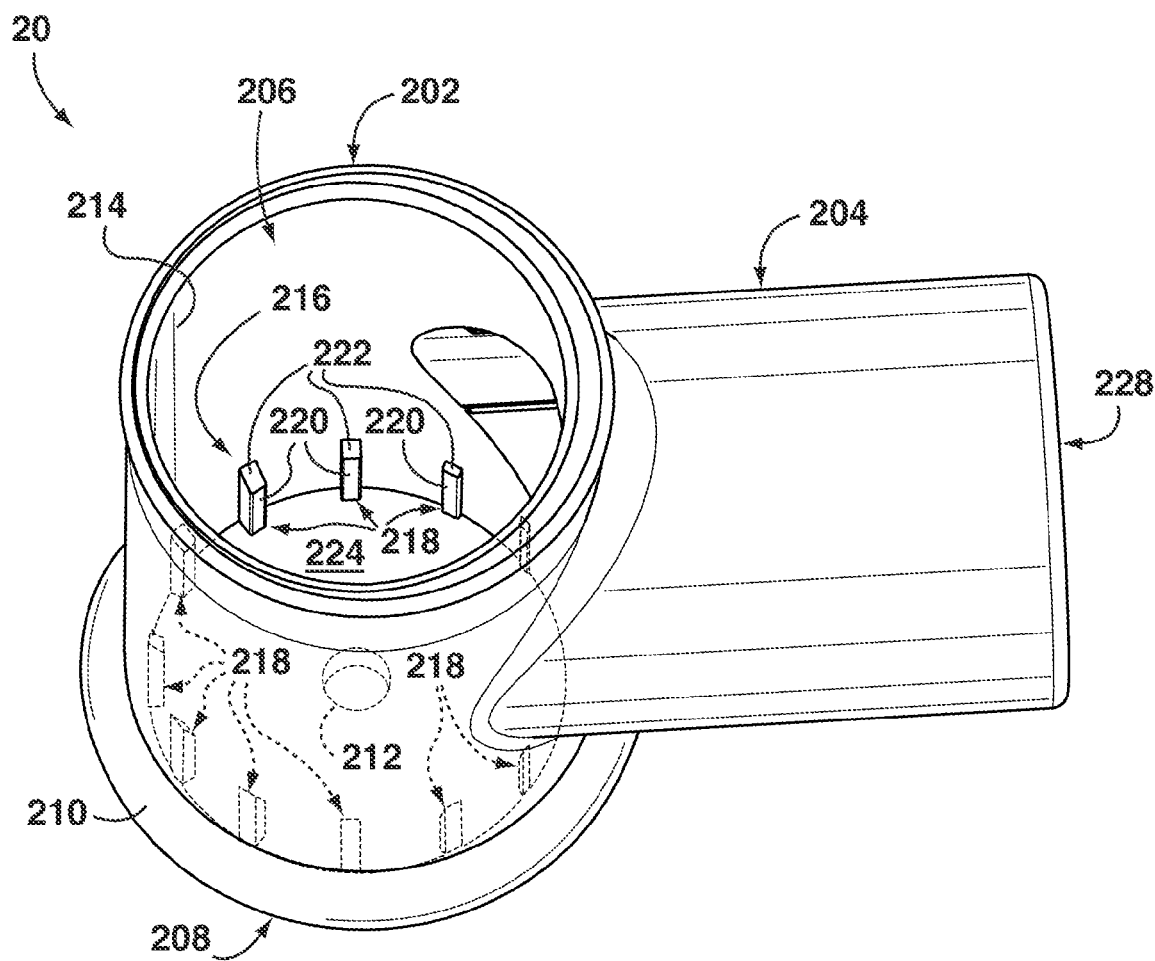
FIG. 2 is a top perspective view of one of the exemplary corner connectors shown in FIG. 1.
Figure 4:
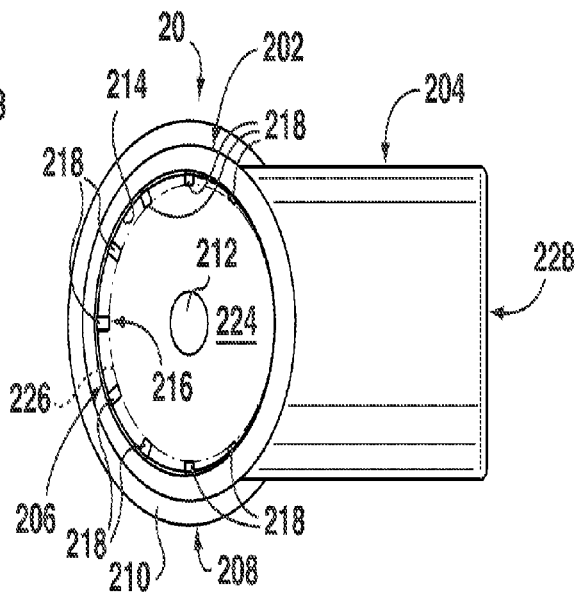
FIG. 4 is a top view of the corner connector of FIG. 2.
Figure 5:
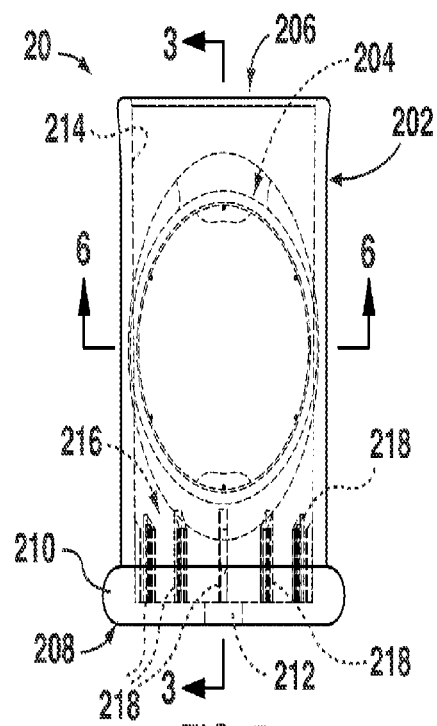
FIG. 5 is a front view of the corner connector of FIG. 2.
Figure 6:
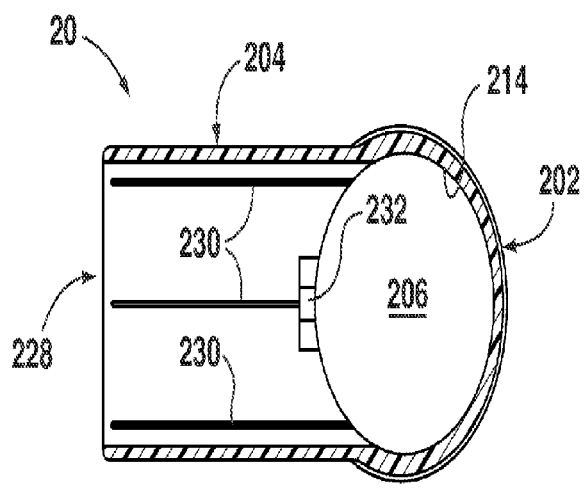
FIG. 6 is cross-sectional view of the corner connector of FIG. 2, taken along the line 6-6 in FIG. 5.

As best seen in FIGS. 2, 4 and 6, the first tube 202 has a generally circular inner surface 214. Although in the illustrated embodiment the inner surface 214 is precisely circular, the term "generally circular", as used in reference to the inner surface of the first tube 202, is not limited to precisely circular or even curvilinear forms; the term "generally circular" in this context also includes suitable regular polygonal shapes defining an inscribed circle. Similarly, the outer surface of the first tube is not limited to any particular shape.

Continuing to refer to FIGS. 2, 4 and 6, a retainer 216 projects inwardly from the inner surface 214 of the first tube 202. As will be explained in greater detail below, the retainer 216 can, in cooperation with the inner surface 214 of the first tube 202, engage an upright such as the upright 12 in FIG. 1 in a friction fit or interference fit to retain the upright within the first tube 202. In the illustrated embodiment, the retainer 216 comprises a plurality of circumferentially spaced individual projections 218 that extend radially inwardly from the inner surface 214 of the first tube 202. In the illustrated embodiment, the projections 218 are also connected to the flat inner portion 224 of the base 208. As best seen in FIG. 2, each of the projections 218 forms a flat engagement surface 220 for engaging an upright and a sloping portion 222 distal from the base 208 that slopes from the engagement surface 220 toward the inner surface 214 of the first tube 202.

As best seen in FIG. 4, the projections 218 increase in radial length with increasing circumferential distance from the second tube 204, with the radially longest projection 218 being directly opposite the second tube 204, and with no projection beneath the axially central portion of the second tube 204. The projections 218, in particular the engagement surfaces thereof, define a notional circle 226 (FIG. 4) of smaller diameter than the inner surface 214. The notional circle 226 is preferably non-concentric with the inner surface 214 and offset toward the second tube 204. Also preferably, the circumference of the notional circle 226 intersects the circumference of the circle defined by the inner surface 214, adjacent the second tube 202. When the inner surface of the first tube 202 has a regular polygonal shape, the notional circle defined by the retainer would be smaller than the inscribed circle defined by the polygon and non-concentric with that inscribed circle, preferably intersecting that inscribed circle.

Although in the illustrated embodiment the retainer 216 takes the form of a plurality of individual projections, other types of retainers may also be used. For example, a continuous crescent-shaped retainer defining a notional circle of smaller diameter than the inner surface may be used instead of the projections 218.

Figure 3:
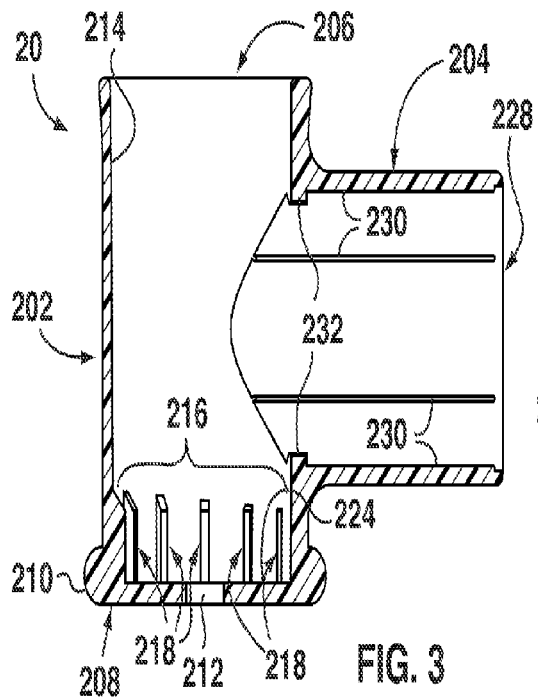
FIG. 3 is cross-sectional view of the corner connector of FIG. 2, taken along the line 3-3 in FIG. 5.

As best seen in FIGS. 3 and 6, in the illustrated embodiment the distal end 228 of the second tube 204, relative to the first tube 202, is open to receive a rear support member, such as one of the rear support members 16, within the second tube 204. A plurality of elongate, spaced apart ribs 230 extend radially inwardly from the inner surface of the second tube 204 and run substantially along the length of the second tube 204 to engage the outer surface of a rear support member and assist in retaining it within the second tube 204 in a friction fit or interference fit. The ribs 230 terminate just short of the distal end 228 of the second tube 204 to facilitate insertion of the rear support member therein. Two opposed inwardly projecting stops 232 at the junction between the first tube 202 and the second tube 204 inhibit a rear support member from being inserted beyond the proximal end 234 of the second tube 204 into the first tube 202. The second tube 204 may or may not open into the first tube 202. In other embodiments, the distal end of the second tube may be closed, and the second tube may be friction fit or interference fit into the open end of a rear support member. As with the first tube, neither the inner or outer surfaces of the second tube are limited to any particular shape.

Reference is now made to FIGS. 7A and 7B, which show how the structure of the retainer 216 permits an upright 12 to rock toward and away from the second tube 204 within the first tube 202 while being securely retained within the first tube 204 by the retainer 216 in cooperation with a part of the inner wall 214 of the first tube 202. FIG. 7A shows the upright 12 in a forwardly rocked position, and FIG. 7B shows the upright in a rearwardly rocked position.

In the forwardly rocked position shown in FIG. 7A, the upright 12 leans slightly away from the second tube 204 and there is a gap 740 between the outside surface of the upright 12 and the inner surface 214 of the first tube 202 above and adjacent the second tube 204. The upright engages the inner surface 214 of the first tube 202 at the open upper end 206 thereof, and the upright 12 is securely retained in the first tube by the retainer 216 in cooperation with the inner surface 214 of the first tube 202 beneath the second tube 204.

If the upright 12 or a crossbar is struck by a ball or other sports projectile moving generally toward the second tube 204, as indicated by force arrow F in FIG. 7B, the upright 12 can rock backward within the first tube 202 while continuing to be securely retained in the first tube by the retainer 216 in cooperation with the inner surface 214 of the first tube 202 beneath the second tube 204. Thus, the upright 12 moves into the gap 740 between the outside surface of the upright 12 and the inner surface 214 of the first tube 202 above and adjacent the second tube 204, creating a new gap 742 between the outside surface of the upright 12 and the inner surface 214 of the first tube 202 opposite the second tube 204. This allows impact force to be absorbed and reduces the risk that the lower corner connector 20 will break. To facilitate this rocking, the diameter of the inner surface 214 of the first tube 202 may be slightly larger toward the open end 206 of the first tube 202 than toward the base 208. Preferably, the portion 742 of the wall of the first tube 202 above and adjacent the second tube 204 is thickened, relative to the remainder of the wall of first tube 202, to provide increased strength (see also FIG. 3). This may be achieved, for example, by having the diameter of the inner surface 214 slightly offset away from the second tube 204, relative to the outer diameter of the first tube 202. After an impact, the upright 12 can be manually reset to the position shown in FIG. 7A.

In one embodiment, a corner connector as described herein may be made from suitable plastic materials, such as polypropylene, and is preferably of monolithic construction. Other suitable materials may also be used.

In one embodiment, the first tube is 3.5 inches long from the open end 206 to the flat inner portion 224 of the base 208, which is 0.150 inches thick, and the diameter of the inner surface 214 of the first tube 202 is 2.066 inches between the base 208 the second tube 204 and 2.121 inches at the open end 206. In this embodiment, the notional circle 226 defined by the projections 218 has a diameter of 1.919 inches, and the engagement portions 220 of the projections 218 extend 0.501 inches from the flat inner portion 224 of the base 208. These are merely exemplary dimensions provided for illustrative purposes, and are not intended to be limiting in any way.

Certain currently preferred embodiments have been described by way of example. It will be apparent to persons skilled in the art that a number of variations and modifications can be made without departing from the scope of the invention as defined in the claims.

What is claimed is:

1. A lower corner connector for a modular sports goal, comprising:
   a first tube having a generally circular inner surface;
   the first tube having an open end and a base opposite the open end for resting on a surface;
   a second tube extending substantially perpendicularly to the first tube; and,
   a retainer projecting inwardly from the inner surface of the first tube;
   the retainer located adjacent the base of the first tube and distal from the open end of the first tube and defining a notional circle of smaller diameter than the inner surface;
   whereby the retainer results in a smaller diameter adjacent the base of the first tube than at the open end of the first tube; and
   wherein an upright is capable of being received in the open end of the first tube inside the first tube so that the retainer engages an outer wall of the upright and thereby retains the upright with the outer wall thereof inwardly spaced from an inner wall of the open end of the first tube such that the upright is permitted to rock toward and away from the second tube within the first tube.

2. The lower corner connector of claim 1, wherein the retainer comprises a plurality of circumferentially spaced individual projections.

3. The lower corner connector of claim 2, wherein the projections increase in radial length with increasing circumferential distance from the second tube.

4. The lower corner connector of claim 2, wherein:
   the projections define a notional circle of smaller diameter than the inner surface;
   the notional circle being non-concentric with the inner surface and offset toward the second tube.

5. The lower corner connector of claim 4, wherein a circumference of the notional circle intersects a circumference of the inner surface adjacent the second tube.

* * * * *